June 6, 1939.  W. F. ZIMMERMANN  2,161,268
CONOIDAL BIT CUTTING MACHINE
Filed Aug. 14, 1937   4 Sheets-Sheet 1

INVENTOR
William F. Zimmermann
BY
Albert F. Nathan
ATTORNEY

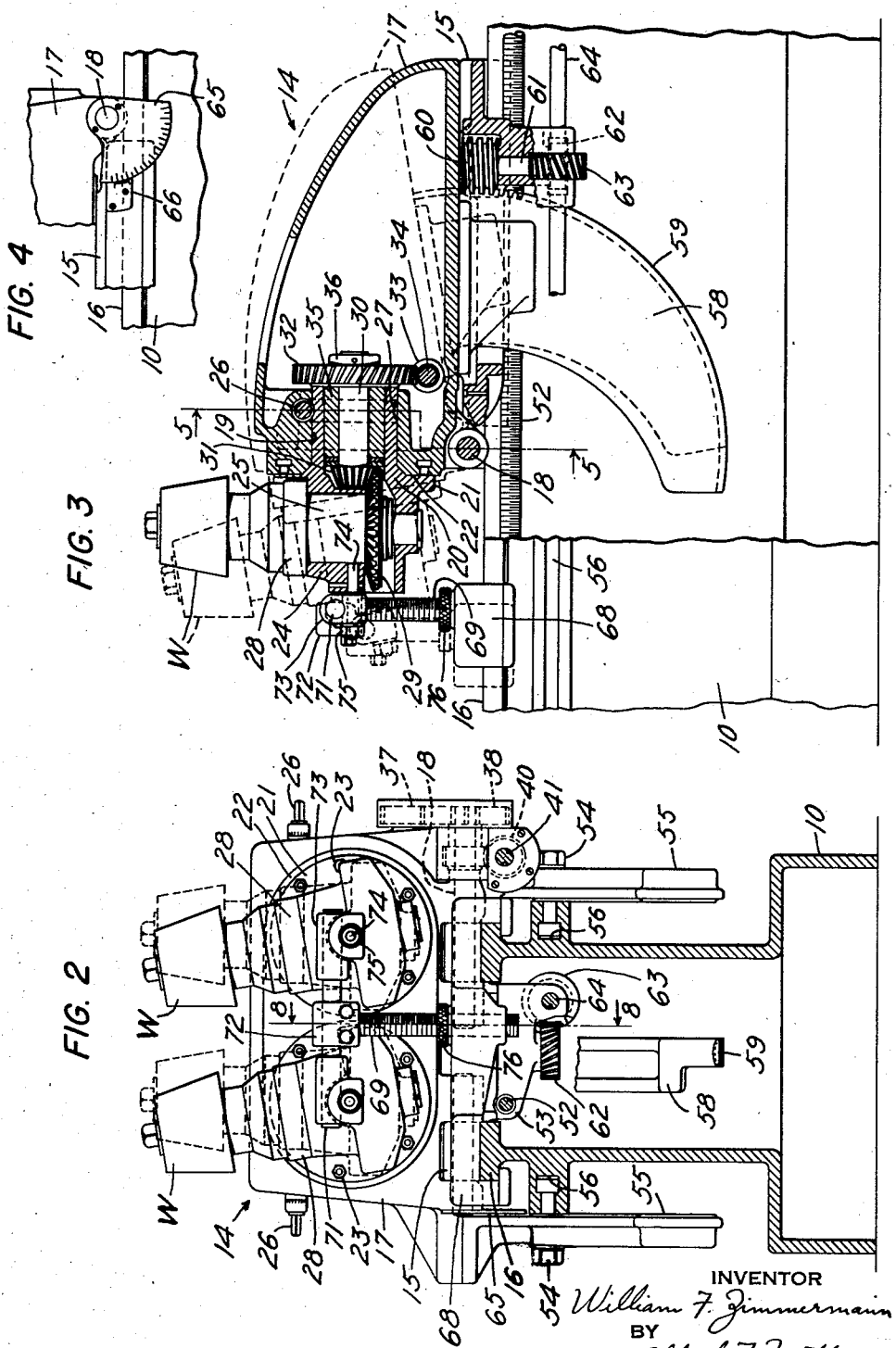

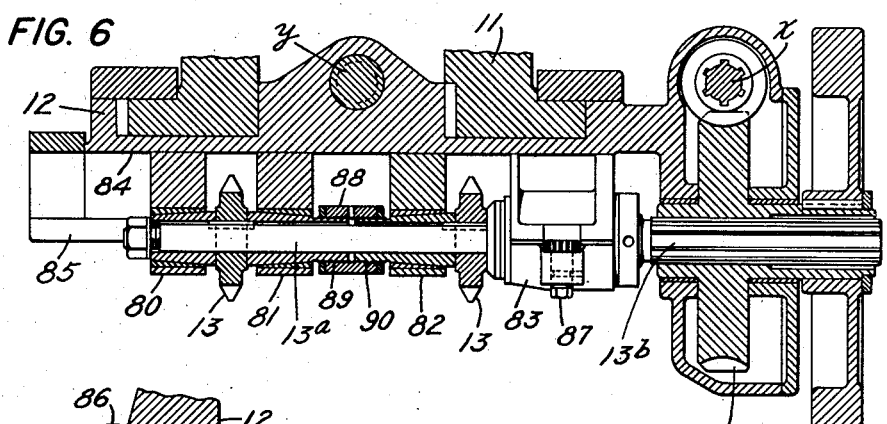
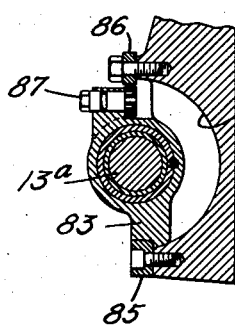
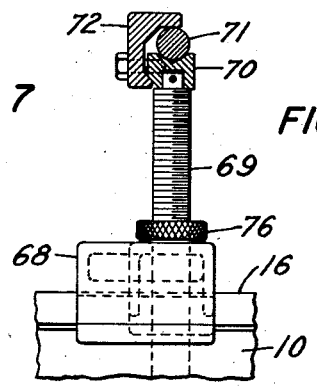
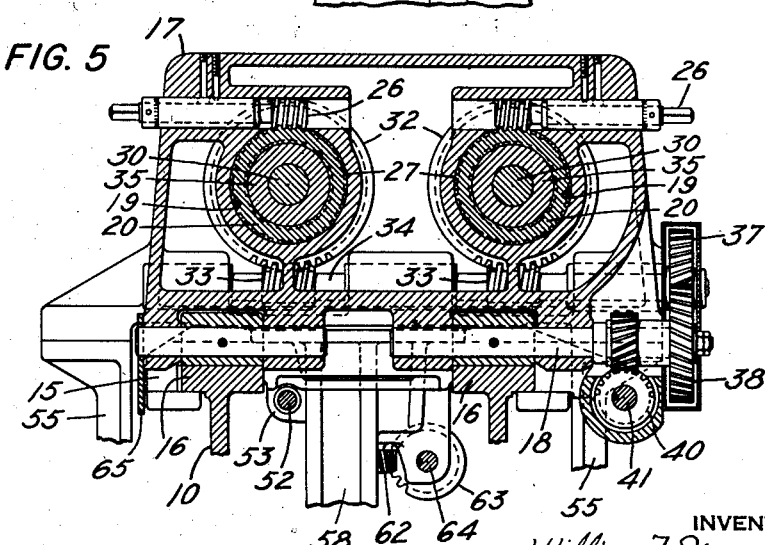

June 6, 1939. W. F. ZIMMERMANN 2,161,268
CONOIDAL BIT CUTTING MACHINE
Filed Aug. 14, 1937 4 Sheets-Sheet 4

INVENTOR
William F. Zimmermann
BY
Albert F. Nathan
ATTORNEY

Patented June 6, 1939

2,161,268

UNITED STATES PATENT OFFICE 2,161,268

CONOIDAL BIT CUTTING MACHINE

William F. Zimmermann, Maplewood, N. J., assignor to Gould & Eberhardt, Newark, N. J., a corporation of New Jersey Application August 14, 1937, Serial No. 159,049

9 Claims. (Cl. 90—15.1)

This invention relates to gear cutting machines in general and in particular to a machine for cutting approximately spiral grooves in conoidal roller cutters used in roller bits for deep well drilling.

Owing to the severe usage to which roller cutters of that character are subjected, the cutters wear rapidly and for efficient drilling must be replaced often, and a primary aim of the invention is to produce the conoidal cutters inexpensively and expeditiously.

A further aim of the present invention is to render available a machine capable of cutting one or more grooves on a tapered or cone shaped workpiece, which groove or grooves may be parallel to the axis of the work or at an angle thereto. As a refinement thereof, a further objective is to provide in a machine capable of performing such operations, a conveniently accessible mechanism for adjusting the work arbor relative to the cutter to the proper angular relation required for a given workpiece without the necessity of using makeshift auxiliary devices or attachments in the operation.

Another objective of the invention is to render available a machine capable of performing a tooling operation on two or more work blanks simultaneously, and each blank being capable of independent adjustment in accordance with the particular angular relation of the grooves to be cut thereon with respect to the axis of the blank.

A further concept of the invention is to provide a machine capable of being adjusted to different diameters of work blanks and depth of cut of the grooves, and such machines to arrange a power drive for the work arbor operative in all positions of the single or compound tilt and irrespective of the diameter and lengths of the workpieces to be operated upon.

In attaining the objectives of the invention it is proposed to provide a machine, similar in some respects to a gear cutting machine, with one or more work arbors journaled in a tiltable carriage. Each arbor is mounted in the carriage so that it is also movable about an axis transverse to the axis of tilt so that the axis of workpiece may be inclined laterally relative to the line of movement of a grooving cutter. That is to say, if the work blank is in the shape of a cone and is to be grooved in an axial direction, the blank may be tilted to place its peripheral surface in the line of cut of the cutter and at the angle required to make a groove of uniform depth throughout. However, if the grooves are to extend somewhat helically around the periphery, the arrangement is such that the work blank may be given a further adjustment relative to the line of movement of the cutter, to effect that result. In the latter event, means are also provided for shifting the grooving cutter in the direction of its axis sufficiently to produce approximately parallel grooves and teeth on the laterally inclined conoidal workpiece.

In the case of a drill roller bit cutter, the teeth thereon need not be cut or finished with the accuracy of the teeth of a bevel gear for the reason that they are afterwards treated by welding on stellite to provide a hard wear resisting surface for crushing the rock. This invention provides a machine which may be conveniently and expeditiously set to cut helical teeth on conical surfaces of various pitches and diameters without necessity of auxiliary devices or attachments that may be used for only one particular setting or condition.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure, and in such drawings, like characters of reference denote corresponding parts throughout all the views, of which:

Fig. 2 is a vertical sectional view looking toward the work spindles.

Fig. 3 is a longitudinal section through one of the work arbors.

Fig. 4 is a detail view of a dial for indicating the angle of tilt.

Fig. 5 is a vertical section taken along line 5—5 of Fig. 3 illustrating a preferred method of driving and laterally tilting the work supporting spindle.

Fig. 6 is a horizontal sectional view through the cutter spindle.

Fig. 7 is a vertical sectional view through one of the spindle bearing supports.

Fig. 8 is a sectional view of the outboard support for the work spindle, through line 8—8 of Fig. 2.

Figure 1:
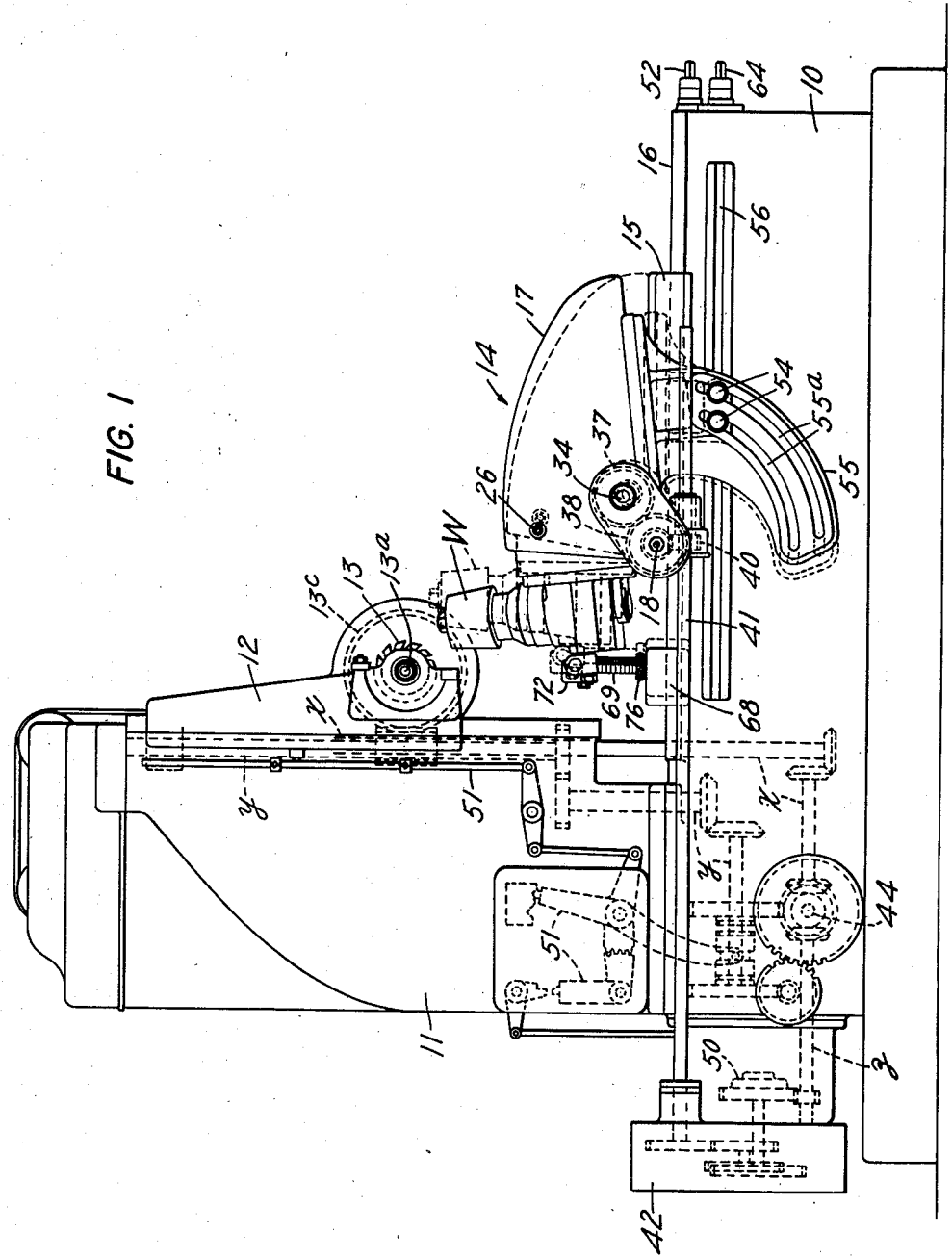
Figure 1 is a side elevation of a machine embodying this invention.

Referring to Fig. 1 of the drawings, the invention is disclosed in connection with a machine having the general characteristics of a gear cutting machine, and includes a base member 10, and an upright stanchion 11 upon which is mounted for vertical reciprocation a tool slide 12. The tool slide carries one or more cutters 13 which is driven through the gearing and shafting indicated by dotted lines x. The cutter drive may follow the drive described and illustrated in the patent to Eberhardt No. 1,030,291. As the invention here involved is not particularly concerned with the drive to the cutter 13, or with the drive y for feeding and retracting the cutter, reference to the aforementioned patent is deemed sufficient for the present purpose.

Mounted upon the bed 10 for translation toward and away from the cutter stanchion, is a work holding slide indicated generally as 14. The work slide 14 comprises a base member 15 that slides on ways 16 on the bed and has pivoted thereto a tiltable housing 17.

As illustrated in the drawings the axis of tilt 18 is transverse to the direction of movement of the slide 15, so that the housing may be tilted in the plane of the cutter and toward or away from the line of movement thereof. The side of the housing 14 facing the cutter slide 12, is provided with one or more journal bearing portions 19 within which are rotatively mounted flanged arbor supports 20. The flanged portion 21 seats against a face 22 of the housing and may be clamped in any angularly adjusted position thereto by T-bolts 23. A manually operable worm shaft 26 engaging a worm wheel 27 cut on the hub of the support 20 provides a conveniently accessible means for effecting the angular adjustments.

The support 20 is provided with another journal bearing portion 24, arranged preferably on an axis perpendicular to the axis of rotation of the support and within which a work arbor 25 is rotatively journaled. Each arbor is provided with a work receiving portion 28 and a driving gear 29 by which it is intermittently rotated.

In order to achieve an intermittent or indexing motion of the work blank in all laterally inclined and forwardly tilted positions, a shaft 30, coaxial and within the hub of the support 20 is provided. The forward end of the shaft carries a bevel gear 31, in mesh with the arbor gear 29, and the outer end of the shaft 30 carries a worm wheel 32 that meshes with a worm 33 on a transverse stub shaft 34. The stub shaft 34 is journaled in bearings in the tilting housing 17, and by the arrangement just described a drive to the arbor may be effected in all tilted or laterally inclined positions. A bushing 35 screwed into the hub of the support 20, in conjunction with a collar 36, maintains the shaft 30 and gear 32 in their proper positions.

The stub shaft 34 receives power through a train of gears 37 and 38, the gear 38 being a compound gear journaled on the transverse shaft 18, receiving its power through a gear 40 splined to an index shaft 41. The shaft 41 extends into the gear box 42 and is driven intermittently in timed relation with the reciprocatory motion of the cutter slide 12.

Figure 9:
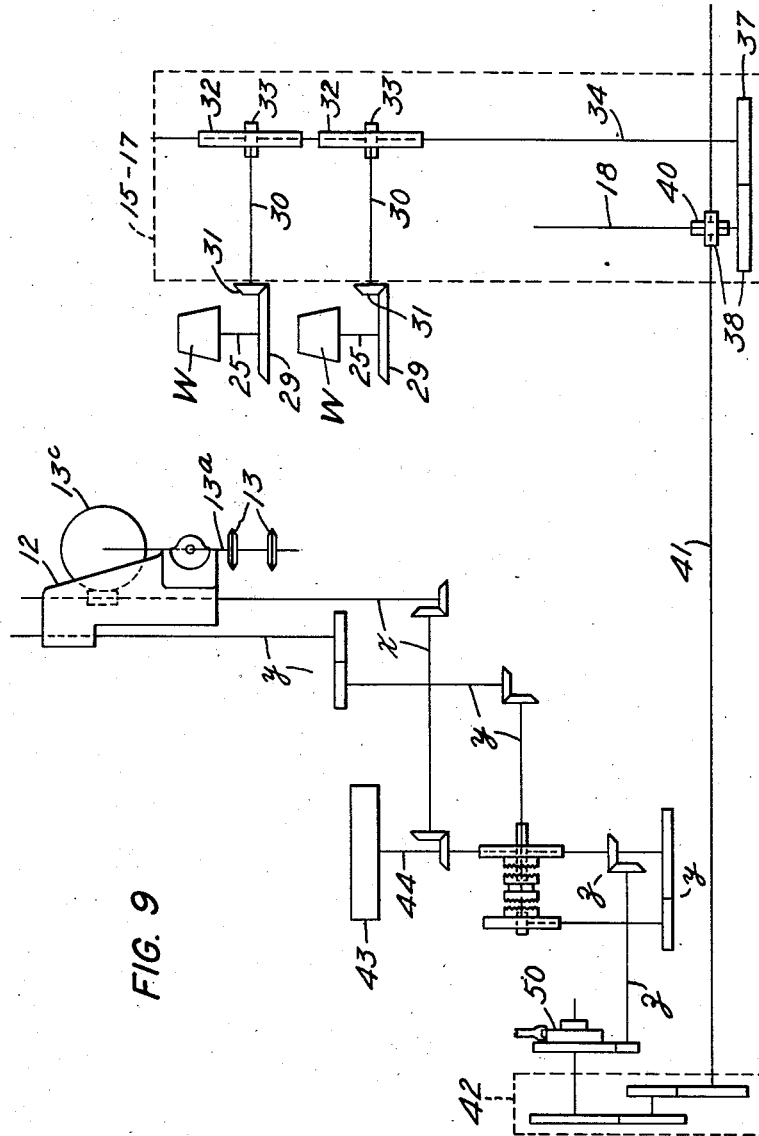
Fig. 9 is a line diagram of a power drive to the cutters and work blanks.

The diagrammatic drawings, Fig. 9, illustrate the general features of the entire drive and may be briefly explained as follows: Power enters the machine through a motor or pulley 43 to shaft 44 where it divides into three branches. One of the branches indicated as $x$ drives the cutter spindle 13$^a$. Another branch $y$ provides the power feed and rapid traverse movement for the cutter slide 12, and a third branch $z$ provides power intermittently to the index shaft 41 and work arbors 25.

The indexing movements are controlled by a friction clutch 50 in the index branch which in turn is controlled by tripping mechanism 51 operated by the tool slide. The details of the cutter feed and work indexing mechanisms and controls therefor are disclosed in said patent to Eberhardt and need not therefore be further described other than to say that in operation the cutter feeds slowly downward through the workpiece and returns rapidly. On the return stroke of the cutter slide, the work arbor automatically indexes to a new position and the cycle is repeated until the required number of grooves or splines have been cut on the work blank.

In order that various diameters of conoidal blanks may be worked upon, the work supporting slide 14 is arranged to be adjusted along the guideways 16 toward or away from the cutter stanchion. For this purpose a screw shaft 52 is non-translatably journaled in the base 10 and cooperates with a nut 53 on the slide 15. By applying the wrench or crank to a squared end of the shaft 52 and actuating same, the entire work supporting assembly 14 may be adjusted along the ways 16 to the proper position required. When an adjustment has been made the assembly is clamped firmly in position by means of clamp bolts 54. The screws 54 pass through arcuate slots 55$^a$ and a bracket 55 carried at each side of the tilting head 17 and are slidable in T-slots 56 on the base of the machine.

The tilting movements of the housing 17 are effected through a third segment 58, depending therefrom, having rack teeth 59 in its outer periphery. A worm gear 60 journaled in the slide 15 engages the rack teeth on the segment and is driven through shaft 61, gears 62 and 63, and a splined shaft 64. The shaft 64 likewise is journaled in the base of the machine and is squared at its outer end to receive a crank by means of which the housing 17 may be tilted. A graduated dial 65 carried by the tiltable housing cooperates with a vernier plate 66 on the slide 15 for indicating the angle of tilt. In this connection it will be observed that the clamp bolts 54 and the associated clamp elements previously described perform the further office of a clamp means for the tiltable housing 17. By reason of the self-locking action of worm 60 and rack 59 and the similar self-locking action between the screw 52 and nut 53, either the tilted position of the housing 17 or the longitudinal position of the assembly on the bed 10 may be changed without disturbing the other adjustment.

To insure rigidity in the mounting and supporting of the work blank in all of its compoundly tilted or longitudinally adjusted positions, an outer support for the work arbors is provided. This support consists essentially in a supplemental slide 68 closely fitting the guideways 16 on the bed of the machine. A threaded shaft 69 extends upward from the slide 68 and has a universal connection at its upper end with outer ends of the work arbors. The top of the shaft 69 carries a V-block 70 adapted to seat a transverse shaft 71. A clamp 72 is provided for clamping the transverse shaft in place. Each end of the shaft 71 is provided with a bracket 73 bored to receive a stud 74 secured to each work arbor support at the axis of rotation. That part of the work support immediately surrounding the stud 74 is finished flat so that the bracket 73 may be clamped thereto by pulling up the nut 75 on the stud 74. A nut 76 on the shaft 69, which may be in the form of a sleeve, shoulders against the auxiliary slide 68 and transmits thereto the downwardly acting forces resulting from the tooling operation.

When the angle of tilt of the housing 17 is changed, the axis of the transverse shaft 71 moves in an arc and as it is connected with the vertical shaft 69 the latter likewise moves in an arc, and in so doing automatically adjusts the supplemental slide 68 along the ways 16. Simultaneously the screw shaft 69 translates in the slide 68 when the angle or the pitch of the work arbor is increased, the outboard supporting nut 76 is first backed off from the slide 68 to allow for the vertical movement and when the proper tilted position is obtained the nut is again moved against the supplemental slide 68 and locks the outer end of the arbor bracket against downward movement.

When it is necessary to incline the work arbor laterally while in a forward tilted position, that may be done merely by releasing clamp nut 75 and T-bolts 23 and the work arbor bracket may be freely rotated.

By referring to Fig. 2 of the drawings, it will be observed that as the work arbor is inclined laterally, whether or not it is also tilted forward, the work blank proper shifts bodily to the right or to the left, as the case may be, and the cutter 13 no longer is in alignment with the axis of the work blank. To restore the cutter to a radial plane or substantially a radial plane of the workpiece, it is proposed to shift the cutter in a direction of its axis. Figs. 5 and 6 of the drawings, illustrates a preferred method of accomplishing that end. In these figures, a two cutter mounting is disclosed which will serve to illustrate the shifting principle involved. A spindle 13ª has a splined connection 13ᵇ with worm gear 13ᶜ that forms part of the drive train x. The splined connection provides a drive to the cutter spindle while nevertheless allowing the spindle to be adjusted in an axial direction over a relatively large range. The axial adjustment is afforded in the present instance by means of adjustable blocks 80, 81, 82, 83, which fit a cradle 84 formed in the tool slide 12. Clamp straps 85, 86, are provided for clamping the bearing blocks firmly in position.

Fig. 6 of the drawings illustrates more clearly the rack and pinion mechanism 87 of the main bearing block 83 for shifting the latter relative to the tool slide 12. In making an adjustment of the cutter in an endwise direction, the clamp straps 85, 86, are released and the rack and pinion mechanism 87 operated to shift the main bearing to a position wherein the cutter, shown at the right in Fig. 6, will operate in a substantially radial plane of the laterally inclined work piece. Thereafter, the clamp straps of the bearings 82, 83, are tightened and a nut 88 operated to shift the left hand cutter to a position wherein its center line is substantially coincident with the radial plane of its related work blank.

Each of the cutter bearings comprises tapered or cone shaped bearing elements for wear compensating purposes. The inner cones of bearings 81 and 82 extend toward each other and are provided with right and left handed threaded portions 89 and 90 and which are coupled together by means of the nut 88 previously mentioned. The right and left hand threaded portions provide a convenient means for taking up any wear in the bearings 81, 82, and for quickly shifting the left hand cutter in an axial direction.

In setting up the machine for cutting grooves and teeth on a conoidal work blank, the operator mounts a blank W upon the work spindle 25 and translates the work carriage toward the cutter approximately to the position required. The work arbor is then inclined laterally to the spiral angle of the teeth desired and clamped firmly in place. Thereafter, the housing 17 is elevated by the shaft 64 until the axis of the work arbor leans toward the cutter at the angle required to position the surface of the cone shaped workpiece substantially parallel to the line of movement of the cutter. The final longitudinal adjustment of the work carriage is then made to obtain the proper depth of grooves to be cut and the thrust collar 76 of the outer support screwed down to engagement with the supplemental cross slide. In the meanwhile the slide 68 automatically adjusted itself longitudinally with the main work carriage and also with respect to the tilted position thereof. Clamp bolts 54 are then actuated to clamp the parts in position.

When all adjustments of the work support have been made and completed the cutter 13 is shifted laterally in its support a distance sufficient to produce an appproximately parallel and pointed exterior edge on the teeth of the work blank. The machine is then started and the cutter feeds slowly downwardly cutting a groove in the workpiece and after completing the grooving operation the trip mechanism automatically operates to effect a return of the tool slide at a relatively rapid rate. At the completion of the upward movement of the slide, the power indexing mechanism operates through the parts numbered 29 to 42, in the transmission mechanism z to reposition the work blank. At the completion of the index movement the cutter carriage again feeds downwardly and the operating cycle is successively repeated until the blank has been completely grooved.

The invention, accordingly, proposes a structure having few movable parts which may be adjusted relative to one another to adapt the machine for cutting parallel grooves on workpieces of a wide range of sizes and tapers. The changes required to adapt the machine from one run of work to another is simply and expeditiously made without resort to auxiliary devices or attachments. A machine so constructed embodies the important feature of flexibility and requires no jigs or special fixtures for any cutting angle within the range of the machine, for the machine incorporates the entire range of compound angles encountered in this particular field.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. In a machine for cutting approximate spiral grooves in conoidal work blanks the combination of a work support and a grooving cutter carriage, a cutter on said carriage, a work arbor on said support adapted to support a conoidal work blank; manually operable means for tilting the axis of said work arbor in the plane of said cutter; additional means for inclining the axis of said arbor in a transverse direction out of the said plane of the cutter; and mechanical means for effecting relative rectilinear movement between said cutter and work blank thereby to cut an approximate spiral groove in said conoidal work blank.

2. A work support for a machine adapted to cut approximate spiral grooves in conoidal workpieces comprising, a housing member tiltable in the plane of the grooving cutter of the machine; a work arbor support rotatively journaled in said housing member; a work spindle journaled in said arbor support, the axis of said spindle being transverse the axis of said rotative support; manual means for tilting said spindle and for inclining said tilted spindle laterally; and power means for indexing said spindle in any of its tilted and laterally inclined positions.

3. An adjustable work support for machine tools combining a base member; a translatable carriage mounted thereon; a housing member pivoted to the carriage; a spindle supporting bracket rotatively journaled in said housing on an axis transverse the pivotal axis of the housing; a work spindle journaled in said bracket on an axis transverse the axis of rotation of the bracket; means for translating said carriage; manual means for tilting said housing relative to the carriage in any adjusted position of the carriage and for laterally inclining said spindle relative to the housing; and a power transmission mechanism provided in part by said base member, in part by said carriage, in part by said pivotal housing, and in part by said rotatable bracket for actuating said spindle in any tilted and laterally inclined position.

4. An adjustable work support for a conoidal roller bit cutting machine combining a carriage member normally tiltable in the plane of the cutter of the machine; an arbor bracket rotatively journaled in the carriage on an axis transverse the axis of tilt of the carriage; a work spindle journaled in said bracket on an axis transverse the axis of rotation of the bracket; manual means for tilting said carriage and for rotating said bracket thereby to incline the axis of said spindle in two directions from normal; and manually operable means for clamping said tiltable and rotatable elements in adjusted position.

5. A machine for cutting approximate spiral grooves in conoidal work blanks combining a work support and a grooving cutter carriage, a rotatable cutter on said carriage, a work arbor on said support adapted to support a conoidal work blank; manually operable means for tilting the axis of said work arbor in the plane of said cutter; additional means for inclining the axis of said arbor in a transverse direction out of the said plane of the cutter; manual means for shifting said cutter axially to compensate for the bodily movement of the work blank incident to inclining the axis of the spindle in said transverse direction, and power means for effecting relative movement between said cutter and work blank thereby to cut an approximate spiral groove in said conoidal work blank.

6. A work support for a machine adapted to cut approximate spiral grooves in conoidal workpieces comprising, a grooving cutter; a housing member tiltable in the plane of the grooving cutter; a work arbor bracket rotatively journaled in said housing member; a work spindle journaled in said arbor bracket, adapted to support a conoidal work blank; the axis of said spindle being transverse the axis of said rotative bracket; manual means for tilting said spindle and for inclining said spindle laterally in any tilted position; power means for indexing said spindle in any of its tilted and laterally inclined positions, and means for shifting said grooving cutter laterally to compensate for the lateral adjustment given to the work spindle and work blank to effect approximate spiral grooves in a conoidal work blank.

7. An adjustable work support for machine tools combining a base member; a cutter stanchion having a rotatable cutter thereon; a work carriage mounted on the base and translatable toward or away from the stanchion; a housing member pivoted to the carriage; a spindle supporting bracket rotatively journaled in said housing on an axis transverse the pivotal axis of the housing; a work spindle journaled in said bracket on an axis transverse the axis of rotation of the bracket; means for translating said carriage; manual means for tilting said housing relative to the carriage in any adusted position of the carriage and for laterally inclining said spindle relative to the housing; power transmission mechanism for actuating said spindle in any tilted and laterally inclined position, and means for shifting said cutter in an axial direction to bring the plane of rotation thereof substantially in a radial plane of said tilted and laterally inclined work spindle.

8. An adjustable work support for a roller-bit cutter grooving machine combining a carriage member tiltable in the plane of the grooving cutter of the machine; an arbor bracket projecting therefrom and rotatively journaled in the carriage on an axis transverse the axis of tilt of the carriage; a work spindle journaled in said bracket; an outer support for said bracket; manual means for tilting said carriage and for rotating said bracket in the carriage thereby to incline the axis of said spindle in two directions from normal; independently operable means clamping said tiltable and rotatable elements in adjusted position, said outer support automatically adjusting itself to the tilted position of the arbor bracket and operable thereafter to support the free end of said bracket against the forces incident to the grooving operation.

9. In a machine for cutting a straight groove in the surface of a conoidal workpiece which groove extends generally longitudinally and approximately spirally around the workpiece, the combination of a work support and a grooving cutter carriage, a cutter on said carriage, a work arbor on said support adapted to support a conoidal workpiece; means for tilting the axis of said work arbor in a plane parallel to the plane of said cutter; additional means for inclining the axis of said arbor transversely out of said tilting plane; and power means for effecting relative rectilinear movement between said cutter and work blank, the said plane of the cutter being laterally offset from the original plane of tilt of the workpiece thereby to cause the cutter to cut a straight groove in the surface of the conoidal workpiece at an angle to its longitudinal axis.

WILLIAM F. ZIMMERMANN.